J. BEALL.
Middlings-Purifiers.
No. 156,970.  Patented Nov. 17, 1874.
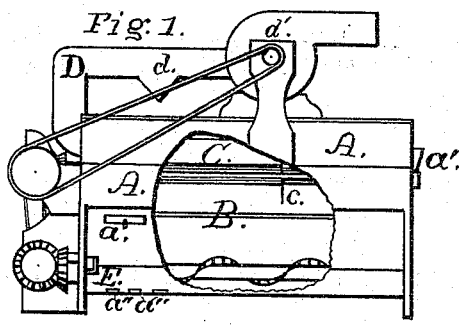
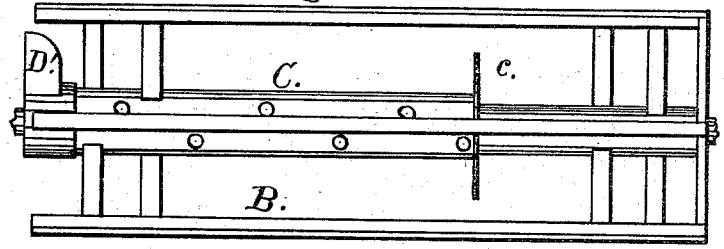
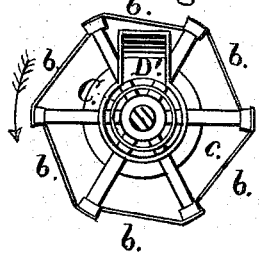
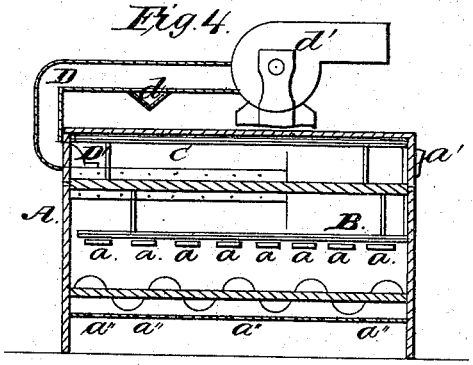
Attest:
Theo. Coleman
Levi P. Graham
Inventor:
John Beall
per Levi P. Graham
Attorney

UNITED STATES PATENT OFFICE.

JOHN BEALL, OF DECATUR, ILLINOIS, ASSIGNOR OF ONE-HALF HIS RIGHT TO C. C. BURROUGHS, OF SAME PLACE.

IMPROVEMENT IN MIDDLINGS-PURIFIERS.

Specification forming part of Letters Patent No. 156,970, dated November 17, 1874; application filed April 4, 1874.

To all whom it may concern:

Be it known that I, JOHN BEALL, of Decatur, Illinois, have invented a Middlings-Purifier, of which the following is a specification:

My invention relates to an improvement in middlings-purifiers, as will be hereinafter described.

Figure 1 is an elevation of my invention with broken section to show the inside; Fig. 2, the reel and air-tube on a larger scale. Fig. 3 is an end view of Fig. 2, and Fig. 4 a longitudinal vertical section of the machine.

A represents the tight box; B, the reel, with cloth arranged as shown in Fig. 3. The air-tube C revolves with reel B, and is perforated, as shown in Fig. 2. $c$ is a disk of sheet metal or other suitable material, extending from the shaft of the reel almost to the circumference of bolt-cloth, thus dividing the reel into two apartments. The one apartment, containing air-tube C, acts as a purifier; the other (being the one next to hopper $a'$) acts as a duster to rid the middlings of the lightest particles of flour, which would otherwise be carried off by the suction. The draft in the dusting-apartment is indirect, and gives the middlings sufficient time to be dusted before drawing them into the purifying-apartment. $D'$ is a continuation of air-chamber D, and is permanently fixed to box A. $a$ is one of a series of regulating-valves, arranged opposite reel B, and provided with saw-toothed props, or their equivalent, said props being attached to the lower edge of the valves, with their teeth encountering the edge of the valve-openings. The valves may be opened as wide as desired, and held there by means of said props, thus regulating the draft directly from the tight box, doing away with the necessity of an internal regulating apparatus. $d'$ is a suction fan, constructed and operating as usual. Spout E and vacuum-chamber $d$ are supplied with valves, by which the air is excluded, while the weight of the offal, when collected in sufficient quantities, operates the valves, which, being relieved of said weight, immediately close again. $a''$ $a''$ are sliding cut-offs for regulating different grades of middlings. The bolt-cloth $b$ is composed of suitable numbers in regular gradation, the finest being nearest, and the coarsest farthest from hopper $a'$. The middlings are conveyed to bolt-reel B by means of hopper $a'$, and the finest grade is bolted before passing partition $c$. After passing $c$ the blast carries the bran and offal through C, D', and D, leaving the heaviest particles in spout E, and a lighter grade in vacuum-chamber $d$. The arrangement of the cloth on the reel is to prevent the middlings being carried around with the reel, and to aid the process of bolting.

I claim as my invention—

1. In a middlings-purifier, the combination, with reel B, of partition $c$, perforated air-tube C, air-chambers D D', and suction-fan $d'$, all constructed and arranged to operate substantially in the manner and for the purpose described.

2. The combination, with reel B, partition $c$, perforated air-tube C, air-chambers D D', and fan $d'$, of box A and valves $a$, all constructed and arranged to operate substantially as set forth.

JOHN BEALL.

Attest:
THEO. COLEMAN,
LEVI P. GRAHAM.